US012571258B2

(12) United States Patent
Ayton et al.

(10) Patent No.: US 12,571,258 B2
(45) Date of Patent: Mar. 10, 2026

(54) PEDESTRIAN ACCESS TERMINAL

(71) Applicant: Vandorf PAT1 Inc., Stouffville (CA)

(72) Inventors: Mark Christopher Ayton, Welland (CA); Benjamin Fraser Powell, King City (CA); Dean Clinton Alberson, Ingram, TX (US)

(73) Assignee: RSG International Corp., Stouffville (CA)

(*) Notice: Subject to any disclaimer, the term of this patent is extended or adjusted under 35 U.S.C. 154(b) by 576 days.

(21) Appl. No.: 17/966,453

(22) Filed: Oct. 14, 2022

(65) Prior Publication Data

US 2023/0121725 A1 Apr. 20, 2023

Related U.S. Application Data

(60) Provisional application No. 63/255,760, filed on Oct. 14, 2021.

(51) Int. Cl.
*E06B 11/08* (2006.01)
*E06B 11/02* (2006.01)

(52) U.S. Cl.
CPC .............. *E06B 11/08* (2013.01); *E06B 11/02* (2013.01)

(58) Field of Classification Search
CPC ......... E01F 15/12; E01F 15/143; E06B 11/02; E06B 11/08
See application file for complete search history.

(56) References Cited

U.S. PATENT DOCUMENTS 1,553,785 A 9/1925 Ley
3,390,865 A 7/1968 Victor et al.
5,547,309 A 8/1996 Mak et al.
6,748,703 B1 6/2004 Mandart
7,037,028 B1 5/2006 Donohoe et al.
7,641,416 B2 1/2010 Miracle
7,699,558 B2 * 4/2010 Adler ...................... E01F 13/00 404/6
8,087,443 B2 1/2012 Snyder et al.
(Continued)

FOREIGN PATENT DOCUMENTS

CN 108532480 A 9/2018
CN 208685447 U 4/2019
(Continued)

OTHER PUBLICATIONS

CIPO, International Search Report, PCT/IB2022/000716, dated May 4, 2023, 13 pages.
(Continued)

*Primary Examiner* — Gary S Hartmann

(74) *Attorney, Agent, or Firm* — John G. Fischer, Esq.; Scheef & Stone, L.L.P.

(57) ABSTRACT

A pedestrian access terminal having a pair of spaced apart terminal blocks that allow pedestrian passage along a roadway. The bottom portions of the terminal blocks are set beneath the surface. A portal extends vertically through each terminal block. Foundation posts are vertically positioned below the surface and extend upward into each portal. Fasteners secure a traffic barrier to each terminal block and foundation post. A tensioning member extends between the foundation posts to increase resistance to lateral movement. Soil plates may be attached to the foundation posts to further resist lateral movement.

26 Claims, 12 Drawing Sheets

(56) References Cited

U.S. PATENT DOCUMENTS

| | | | | |
|---|---|---|---|---|
| 8,777,510 | B2 * | 7/2014 | Maus | E01F 15/143 404/6 |
| 8,807,864 | B2 | 8/2014 | Kulkarni et al. | |
| 8,985,890 | B2 * | 3/2015 | Miracle | E01F 13/123 404/6 |
| 11,499,279 | B1 * | 11/2022 | Lamore | E01F 9/685 |
| 2005/0220536 | A1 * | 10/2005 | Blair | E01F 13/123 404/6 |
| 2008/0121856 | A1 | 5/2008 | Alberson et al. | |
| 2021/0148068 | A1 | 5/2021 | Prins | |
| 2024/0271377 | A1 * | 8/2024 | Ayton | E01F 15/146 |

FOREIGN PATENT DOCUMENTS

| | | | | |
|---|---|---|---|---|
| DE | 102006038336 | B3 | 12/2007 | |
| EP | 0596405 | A1 | 5/1994 | |
| EP | 1 541 768 | A1 | 6/2005 | |
| EP | 1448856 | B1 * | 8/2007 | E01F 15/12 |
| FR | 2278881 | A1 | 2/1976 | |
| FR | 2313545 | A * | 2/1977 | |
| JP | 6863910 | B2 | 4/2021 | |
| KR | 20030042173 | A | 5/2003 | |
| KR | 2003-0086152 | A | 11/2003 | |
| KR | 101778300 | B1 | 9/2017 | |
| KR | 10-2017-0115262 | A | 10/2017 | |
| WO | 2023/173468 | A1 | 9/2023 | |

OTHER PUBLICATIONS

CIPO, International Search Report, PCT/CA2024/050526, dated Jan. 2, 2025, 10 pages.

CIPO, International Search Report, PCT/CA2024/050524, dated Jan. 15, 2025, 8 pages.

EPO, extended Search Report, Application No. 22880478.7, dated Aug. 8, 2025, 8 pages.

* cited by examiner

PEDESTRIAN ACCESS TERMINAL

RELATED APPLICATION

None.

FIELD OF THE DISCLOSURE

This disclosure relates to a pedestrian access terminal such as may be used in a roadside traffic barrier to permit pedestrian access to a beach front or other attraction.

BACKGROUND

A need has been identified along roadways adjacent to pedestrian attractions such as waterbodies and hiking trails where roadside barriers are required to protect errant vehicles from encroaching into the waterbody or trail while maintaining access points through the barrier system for residents living on the opposite side of the roadway to get to the beach, dock, or trail (which may be beyond the roadway right-of-way and owned by the resident).

In some instances, local road authorities create access points through the barrier system that compromise the performance capability of the system to redirect an errant vehicle. This creates potentially hazardous ends that could penetrate and spear vehicle occupants. In other situations, residents have cut or removed parts of the barrier to provide access points.

There is a need to provide standard crashworthy terminal systems on either side of an access point that will properly anchor the end of a road barrier, such as a W-beam or thrie-beam or cable barrier system, to make the roadside barrier system redirective and functional. There is a need to provide standard crashworthy terminal systems to eliminate the potential spearing hazard of a W-beam guardrail improperly terminated with a fish-tail.

Current standard crashworthy terminal systems have gating characteristics which means that when a vehicle impacts them near the start of the terminal, they gate out of the way. One disadvantage to these systems when placed on either side of a gap is that the effective length of the gap through which an errant vehicle could get through the system into the waterbody or other terrain hazard is much longer than the physical opening length of gap provided for pedestrian access.

Terminal systems for a W-beam guardrail are typically gating systems. Another disadvantage to these systems is that W-beam terminal systems typically gate during impacts in advance of the third post downstream of the impact head. Therefore, W-beam terminal systems with a W-beam guardrail on either side of a narrow 33 inch to 65 inch wide access point for pedestrians may result in an effective gap length of approximately 30 feet. For high tension cable barrier system terminals, the effective gap length is significantly longer.

Another disadvantage to these systems is that grading requirements behind gating terminal systems require widening of the roadway in advance and along the terminal and flatter traversable slopes perpendicular to the roadway for the systems to perform as designed. At many roadway locations adjacent to waterbodies where access points are required, widening of the roadway to provide the recommended grading for gating terminals is not practical as it may require placing fill into the waterway.

Non-gating crash cushion options for W-beam and concrete barriers are available that could be used on each side of an access point. One disadvantage to these systems is that crash cushions are typically very expensive to install and require widening of the roadway in advance and along the system and flatter traversable slopes perpendicular to the roadway for the systems to perform as designed. Another disadvantage to these systems is that they are expensive to maintain. Another disadvantage to these systems is that they can be expensive to repair after impacts, dependent on severity and type of impact, and type of system (many use crushable cartridges). Another disadvantage to these systems is that they are also not aesthetically pleasing.

The National Highway Traffic Safety Administration (NHTSA) in the United States has been conducting frontal crash tests since 1978 to assess occupant protection capabilities of new cars. New vehicles are crashed head-on perpendicular into a non-deformable rigid barrier at 56 km/h (35 mph).

Air bags with lap and shoulder belts for drivers and front passengers have been required by legislation in the United States on cars manufactured since Sep. 1, 1997, and on light trucks and vans manufactured after Sep. 1, 1998. These measures significantly increase the survivability of a frontal crash.

There is an opportunity for a pedestrian access terminal that relies on the increased safety of vehicles to safely absorb a limited impact in the design of a pedestrian access terminal. There is also a need for a pedestrian access terminal that limits the probability of an arresting frontal impact.

An advantage of the embodiments of the present invention is that they provide a crashworthy terminal system to allow pedestrian access through a gap in a traffic barrier system such as a W-beam guardrail on lower speed roadways that will meet the crash test requirements of the American Association of State Highway Officials (AASHTO) Manual for Assessment of Safety Hardware (MASH) Test Level 1 (50 km/h [31 MPH]). Another advantage of the presently disclosed pedestrian access terminal is that it is less expensive to install as it does not require extensive widening of the roadway in advance of installation. Another advantage of the presently disclosed pedestrian access terminal is that it is less expensive to maintain.

Another advantage of the presently disclosed pedestrian access terminal is that it is less expensive to repair after commonly anticipated impacts. Another advantage of the presently disclosed pedestrian access terminal is that it is aesthetically pleasing.

Another advantage of the presently disclosed pedestrian access terminal is that it provides an energy absorbing endcap for attachment to the pedestrian access ends of the terminal blocks for the system to be used on moderate speed roadways that will meet the crash test requirements of AASHTO MASH Test Level 2 (70 km/h [43 MPH]).

In summary, the disclosed invention provides a unique solution to the engineering constraints and challenges of providing a pedestrian access terminal that protects pedestrians, prevents gating destruction to the terminal and is cost effective to install, maintain, and repair. The disclosed invention provides the benefits listed above while first and foremost maintaining the safety of the vehicle occupants where installed. The disclosed invention safely and economically overcomes the aforementioned disadvantages.

The advantages and features of the embodiments presently disclosed will become more readily understood from the following detailed description and appended claims when read in conjunction with the accompanying drawings in which like numerals represent like elements.

SUMMARY

A new design for a pedestrian access terminal is disclosed. In one embodiment, the pedestrian access terminal is comprised of a right side and a left side terminal block spaced apart for pedestrian passage along a roadway. Each terminal comprises a top and an opposite bottom, an access end, and an opposite non-access end, and a traffic side and an opposite field side. A portal extends from the top to the bottom. Portal orifices extend through the traffic side of each terminal block to intersect the portal.

A pair of foundation posts is positioned below the surface and extend above the surface and into the portal of each terminal block. Portal fasteners are positioned in the portal orifices of the traffic side and connected to the foundation post in each terminal block. A tensioning member extends between the foundation posts, beneath the terminal blocks.

In another embodiment, a chamber extends through the top of the terminal block adjacent to the portal. The chamber terminates inside the terminal block. Chamber orifices extend from the traffic side and the field side to the chamber. Chamber fasteners located in the chamber orifices connect a traffic barrier to the terminal block.

In another embodiment, the tensioning member further comprises a centralized turnbuckle with a threaded bar extending from each end of the turnbuckle. A connector is attached at the opposite end of each threaded bar. A wire rope extends from each connector. A swage button is located on the opposite end of each wire rope portion. A plate washer locks the swage button of each end of the tensioning member against the foundation post.

In another embodiment, a relief is inscribed on the bottom of the terminal block. The relief intersects the portal opening at the bottom of the terminal block. The tensioning member is located in the reliefs of the terminal blocks and is anchored against the foundation post of each terminal block.

In another embodiment, a pair of lifting anchors is located at the top of each terminal block. A cover plate sufficiently large to cover the portal and the chamber on the top of the terminal block is provided. The cover plate has a pair of cover ports. Cover fasteners are located in the cover plate and connected to the lifting anchors to secure the cover plate to the top of the terminal block.

In another embodiment, an energy absorbing endcap is attached to the access end of the terminal block.

In another embodiment, the foundation post is a hollow rectangular tubular, having a first pair of opposing sides, one of which is a traffic side. The foundation post has a second pair of opposing sides, one of which is an access side. Block fastener ports extend through the first pair of opposing sides. The portal fasteners pass through the portal orifices and into the portal to connect a traffic barrier and foundation post to the terminal block.

In another embodiment, a tensioning portal extends through the second pair of opposing sides of each foundation post. A wire rope portion of the tensioning member extends through the tensioning portal of each foundation post. A swage button is connected to the end of each wire rope portion. A plate washer anchors the swage button of each tensioning member against the foundation post to allow the tensioning member to be tensioned as between the foundation posts.

In another embodiment, plate fastener ports extend through the second pair of opposing sides of the foundation post, beneath the tensioning portal. A soil plate is provided, with fastener ports in alignment with the plate fastener ports. Soil plate fasteners are located through the fastener ports of the soil plate and the plate fastener ports of the foundation post to secure the soil plate to the foundation post.

DETAILED DESCRIPTION

The following description is presented to enable any person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the illustrated and described embodiments, but is to be accorded the widest scope consistent with the principles and features disclosed herein.

Figure 1:
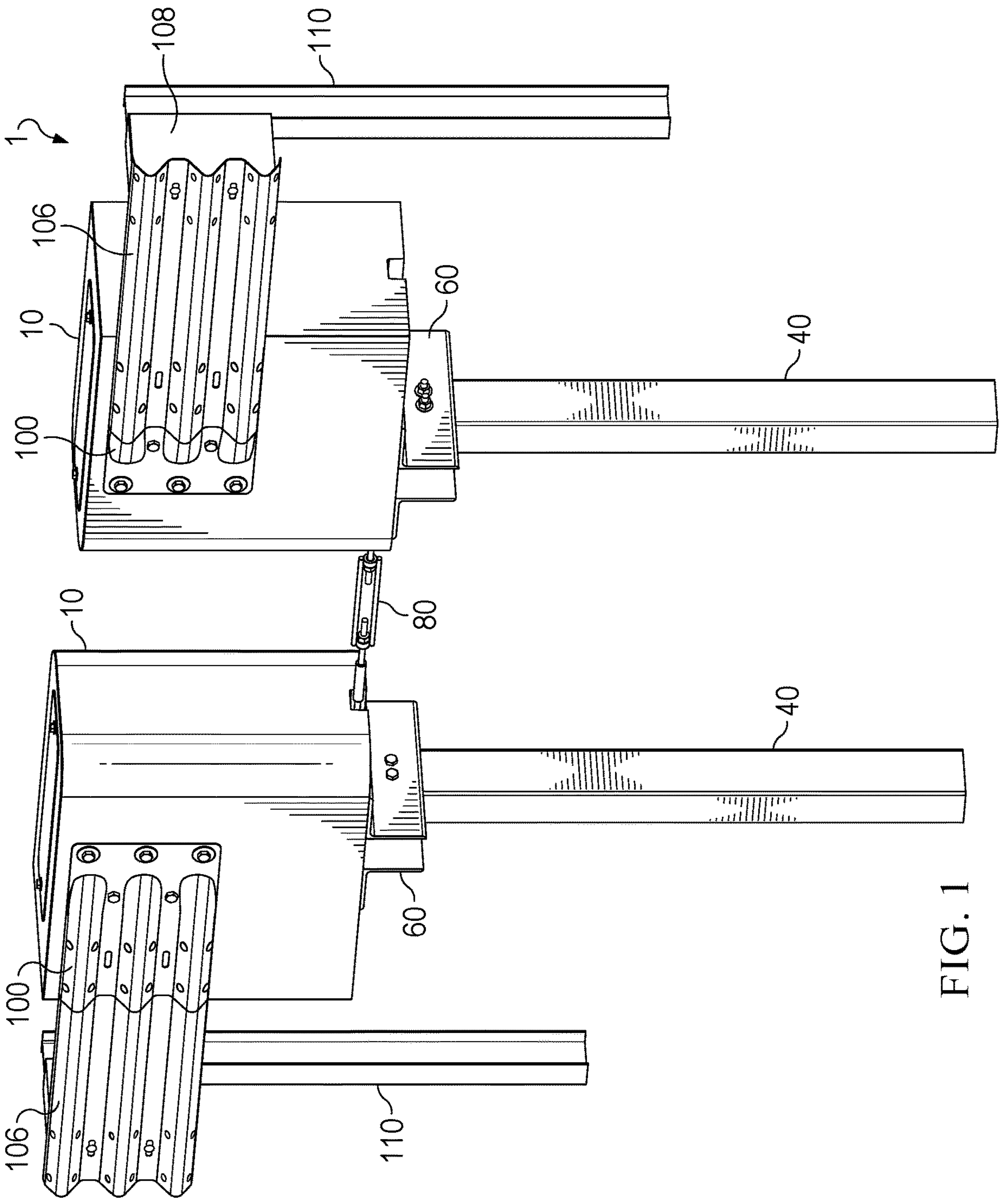
FIG. 1 is a perspective view of an embodiment of the pedestrian access terminal.

FIG. 1 is a perspective view of an embodiment of pedestrian access terminal 1 of the present disclosure. As seen in this view, a pair of opposing terminal blocks 10 is provided with a distance between them to permit pedestrians to pass. Each terminal block 10 is mounted to a foundation post 40, to which it is attached by fasteners. A soil plate 60 is mounted to each side of foundation post 40 to help resist lateral movement of terminal block 10 when struck by a vehicle. For this purpose, soil plates 60 face the pedestrian access opening between terminal blocks 10.

A tensioning member 80 is connected between foundation post 40 to further recess lateral movement of terminal block 10 when struck by a vehicle. Tensioning member 80 and soil plates 60 are located beneath road surface 2 (see FIGS. 17 and 18). A road barrier transition 100, such as a standard W-beam or thrie-beam barrier, is attached to each terminal block 10. Transition 100 is interconnected to an adjacent road barrier section 106 which is attached to an offset block 108 and a guardrail post 110. In one embodiment, terminal blocks 10 are connected to a crashworthy transition 100 and road barrier section 106 that meets the requirements of AASHTO MASH TL-2.

Terminal blocks 10 are typically made of precast concrete and have a mass of between 3,000 and 3,500 lbs. In one embodiment, terminal blocks 10 are located at a distance of between about 3.3 and 4.9 feet (or 1.0 and 1.5 meters) apart. In one embodiment, a bottom 14 (see FIG. 3) of terminal blocks 10 is set approximately 8 inches below surface 2. In this embodiment, foundation posts 40 are embedded at least 7 feet below surface 2. It will be appreciated by one of ordinary skill in the art that the precise relationships between the elements can be adjusted to obtain a similar result. For example, heavier foundation posts 40 and larger soil plates 60 could be used in combination with a shallower embedment depth of foundation posts 40. The same is true regarding the 8" embedment depth of terminal blocks 10.

Field tests have proven that a mass of between 3,000 and 3,500 lbs. for terminal block 10, when used in combination with soil plate 60, tensioning member 80, foundation post 40, and related design features, will resist significant lateral movement upon impact with a vehicle weighing 5,000 lbs. travelling at up to 31 mph. Full scale crash tests have further proven that when modern passenger vehicles such as a quad-cab pickup truck with a weight of 5,000 pounds and a small car with a weight of 2425 pounds as specified by AASHTO MASH with impact the terminal block at a speed of 50 km/h [31 mph] at 25 degrees according to AASHTO MASH Test Level 1, vehicle occupants will be protected.

Figure 2:
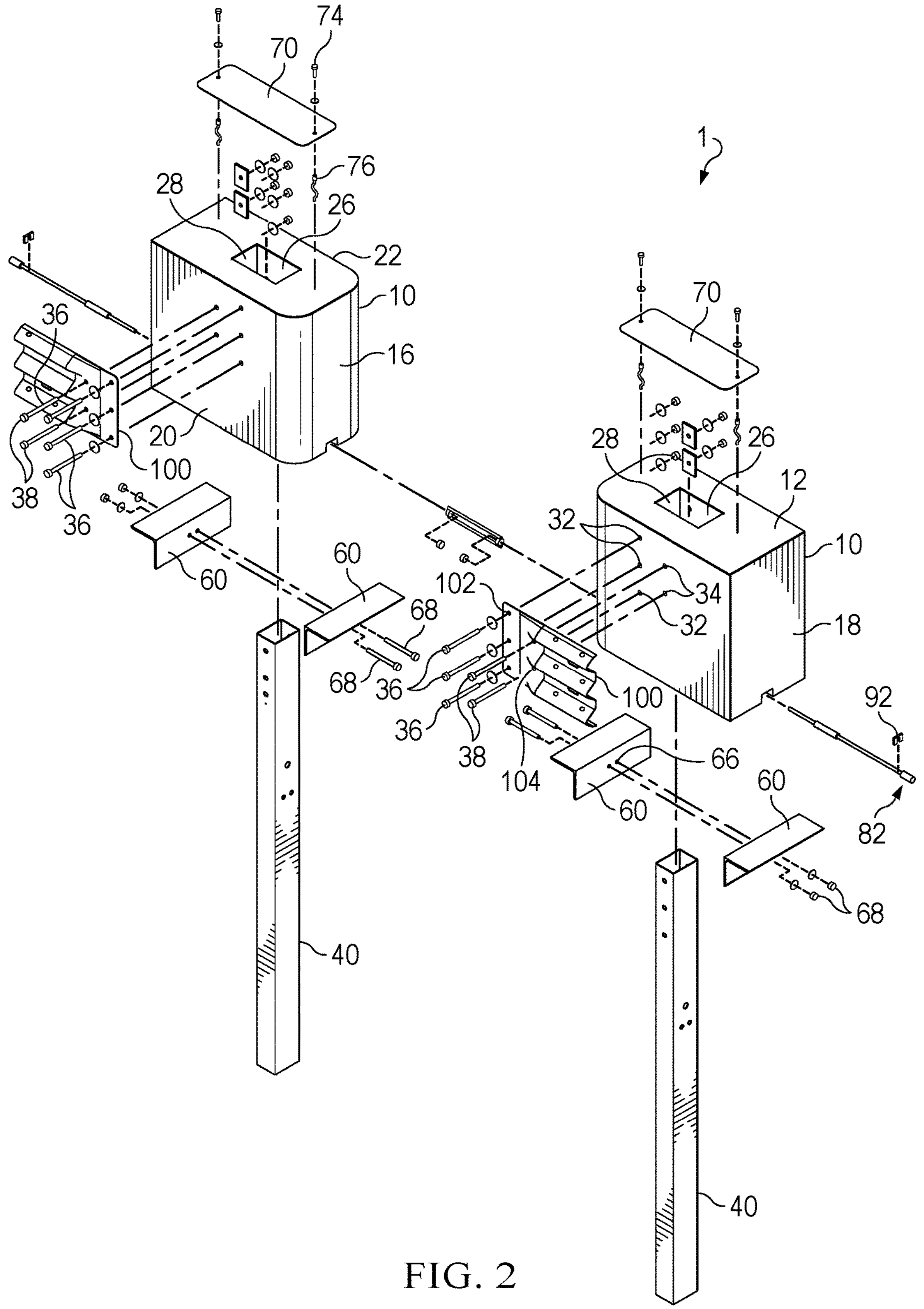
FIG. 2 is an exploded perspective view, showing additional element features and relationships of the pedestrian access terminal illustrated in FIG. 1.
Figure 4:
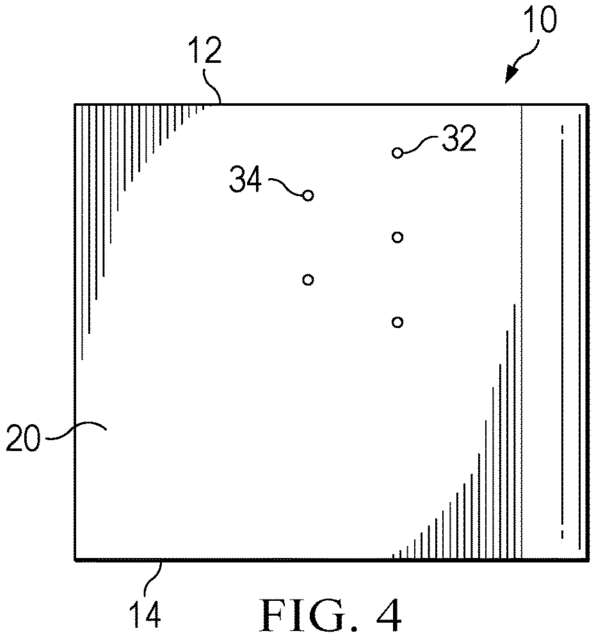
FIG. 4 is a side view of the terminal block shown in FIG. 3.
Figure 5:
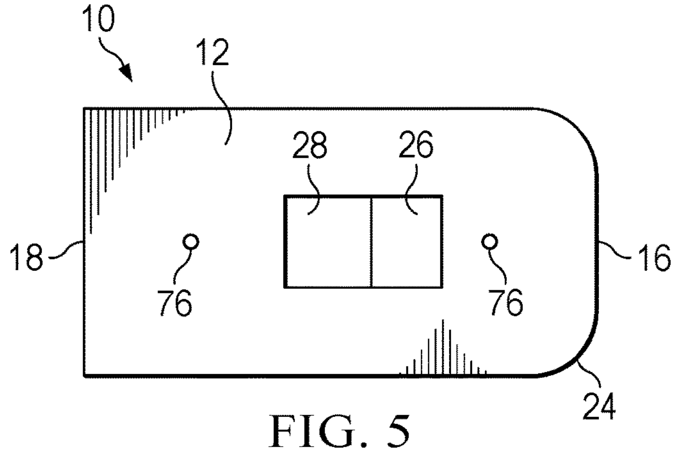
FIG. 5 is a top view of the terminal block shown in FIG. 3.

FIG. 2 is an exploded perspective view, showing additional element features and relationships of pedestrian access terminal 1 as illustrated in FIG. 1. Referring ahead to FIG. 4 and FIG. 5, terminal block 10 has a terminal top 12 and an opposite terminal bottom 14. Terminal block 10 has an access end 16 and a no-access end 18.

Figure 17:
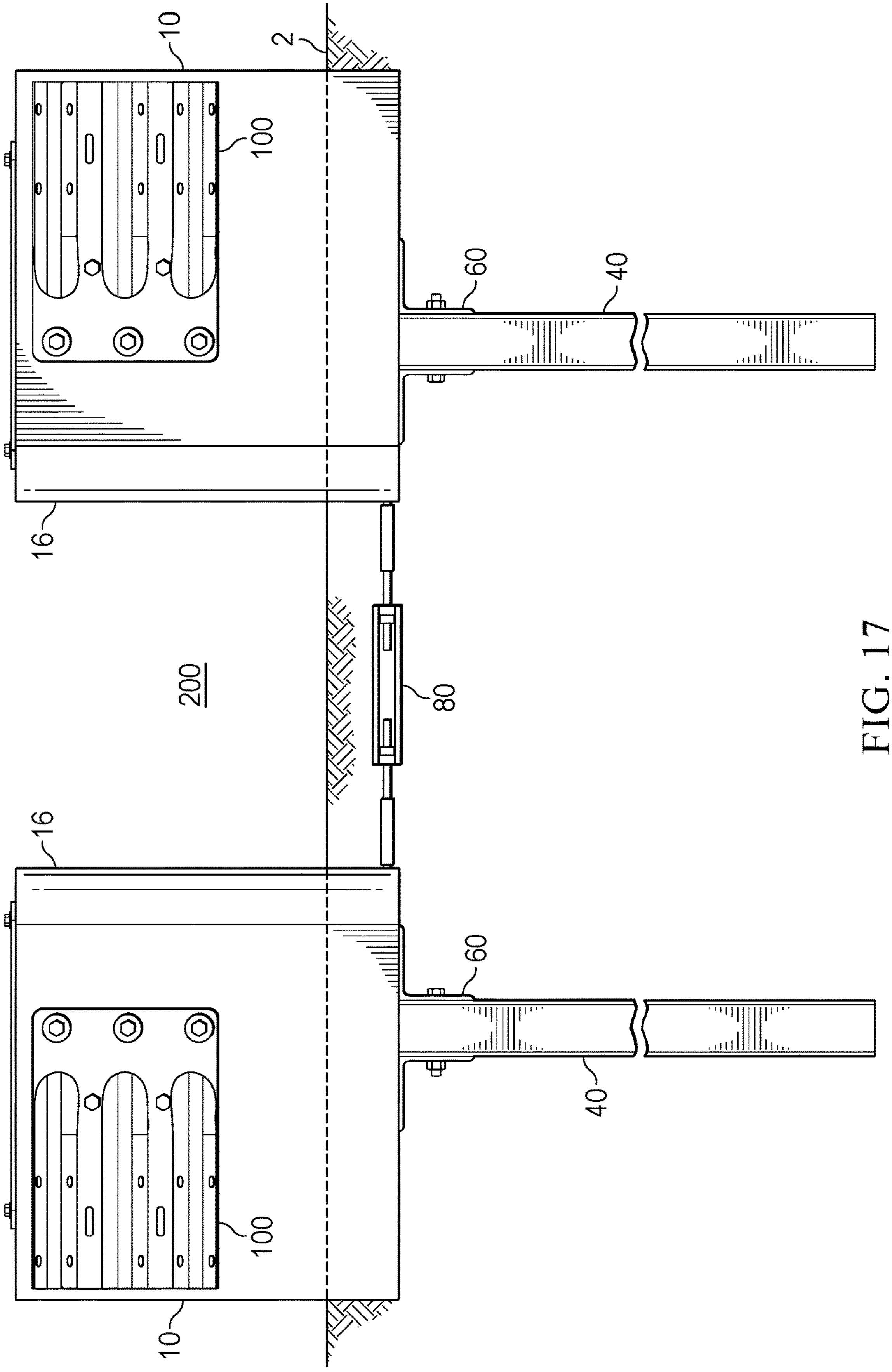
FIG. 17 is a side view of the embodiment of the pedestrian access terminal illustrated in FIG. 1.

Finally, though reversible, terminal block 10 has a traffic side 20 and a field side 22 when placed in position beside a roadway. As best seen in FIG. 17, a pedestrian passage 200 is provided between opposing access ends 16 of opposing terminal blocks 10 where there is no structure between terminal blocks 10 above surface 2 impeding passage 200. Pedestrians, horses, pets, and such are thus provided protected movement through passage 200 between traffic side 20 of pedestrian access terminal 1 and field side 22 of pedestrian access terminal 1.

Referring back to FIG. 2, terminal block 10 has a portal 26 extending through terminal top 12 and terminal bottom 14. Portal orifices 32 extend through traffic side 20 of terminal block 10 to intersect with portal 26. Portal orifices 32 may also extend through field side 22 of terminal block 10 to intersect with portal 26. In this configuration, terminal block 10 is reversible with regard to portal orifices 32 and in relationship to the roadway. Portal fasteners 36 located in portal orifices 32 connect terminal block 10 to barrier transition 100 and foundation post 40.

In the embodiment illustrated, terminal 10 has a chamber 28. Chamber 28 extends through the top of terminal block 10 adjacent to portal 26. Chamber 28 terminates internal to terminal block 10. Chamber orifices 34 extend through traffic side 20 of terminal block 10 to intersect with chamber 28. Chamber orifices 34 may also extend through field side 22. In this configuration, terminal block 10 is reversible with regard to chamber orifices 34 and in relationship to the roadway. Chamber fasteners 38 located in chamber orifices 34 further secure terminal block 10 to barrier transition 100.

Also, in the embodiment illustrated, soil plates 60 are attached to each side of foundation post 40 beneath terminal block 10. Fastener ports 66 (see FIG. 8) in the soil plates 60 receive soil plate fasteners 68 for attachment to foundation post 40. The tensioning member 80 is secured to each foundation post 40.

Figure 3:
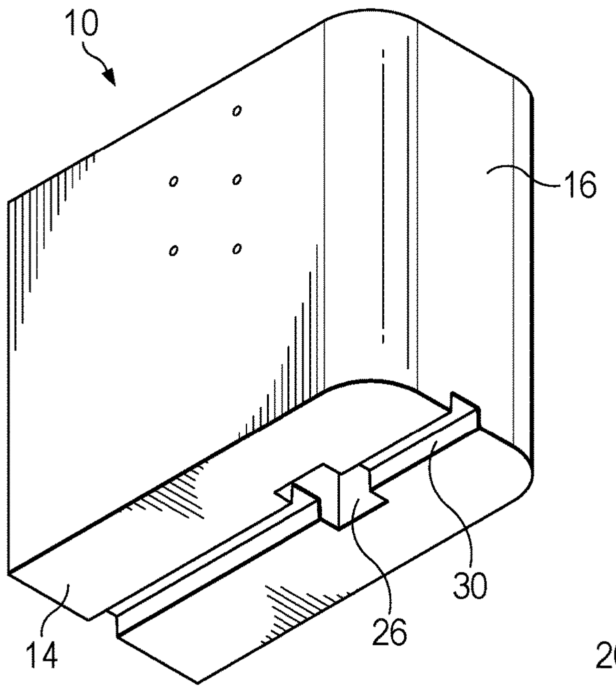
FIG. 3 is a side view of the terminal block shown in FIG. 1.
Figure 6:
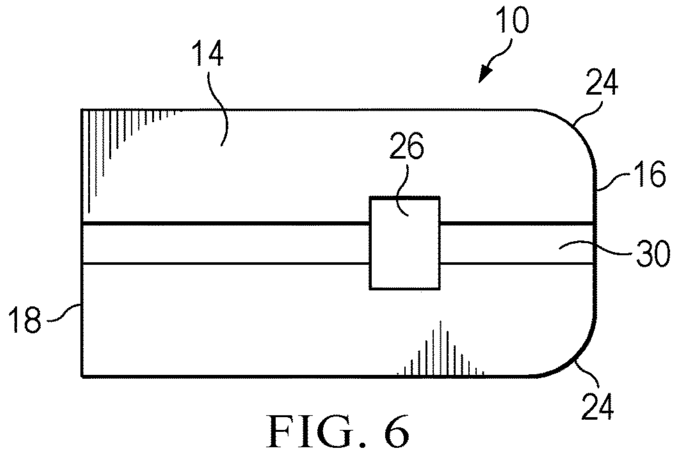
FIG. 6 is a bottom view of the terminal block shown in FIG. 3.

FIG. 3 is a side view of the embodiment of terminal block 10 shown in FIG. 1. FIG. 4 is a side view of terminal block 10 shown in FIG. 3. FIG. 5 is a top view of terminal block 10 shown in FIG. 3. FIG. 6 is a bottom view of terminal block 10 shown in FIG. 3.

Figure 15:
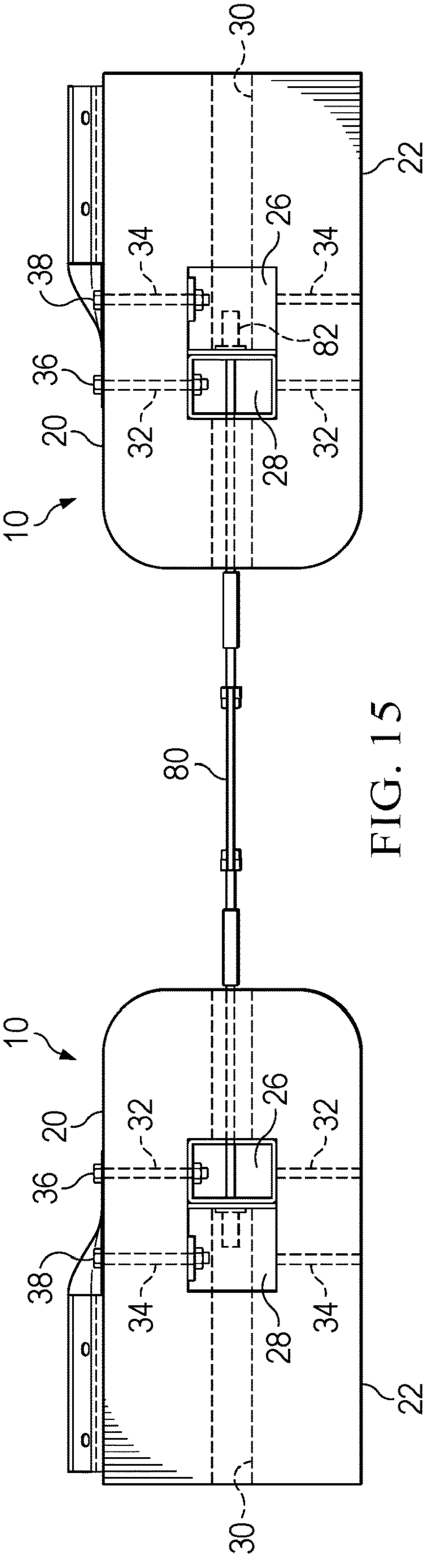
FIG. 15 is a top view of the embodiment of the pedestrian access terminal illustrated in FIG. 1, illustrating various passages internal to the terminal block.

As seen in FIGS. 3 and 6, terminal bottom 14 of terminal block 10 has a relief 30 inscribed across its length. Relief 30 intersects portal 26. As seen in FIG. 4, traffic side 20 of terminal block 10 has a plurality of portal orifices 32, and a plurality of chamber orifices 34. As best seen in FIG. 15, portal orifices 32 intersect portal 26 for receiving portal fasteners 36. Likewise, chamber orifices 34 intersect chamber 28 for receiving chamber fasteners 38.

Figure 13:
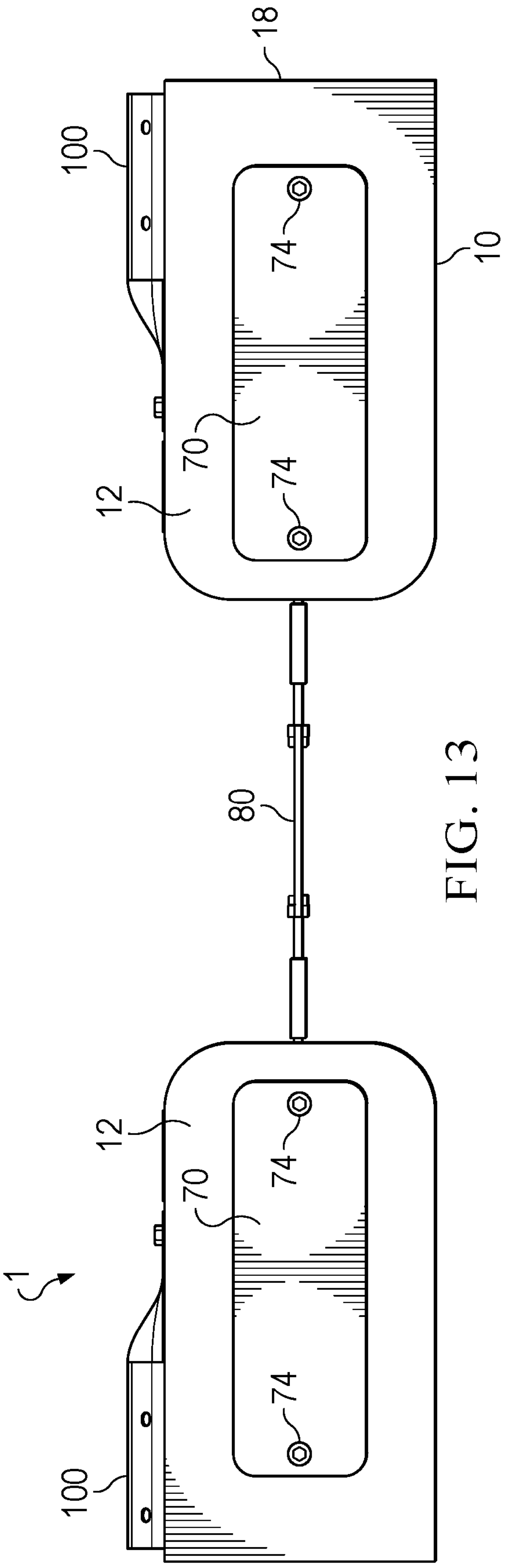
FIG. 13 is a top view of the embodiment of the pedestrian access terminal illustrated in FIG. 1.

As seen in FIG. 5, lifting anchors 76 are located on terminal top 12 of terminal block 10. Lifting anchors 76 provide a means of safely and accurately positioning terminal block 10 in the desired roadside position. Lifting anchors 76 further provide a threaded coupling for cover fasteners 74 as seen in FIG. 2 and FIG. 13.

As seen in FIG. 5 and in FIG. 6, terminal block 10 has a radius 24 at the intersection of its access end 16 and its traffic side 20. In the embodiment illustrated, radius 24 has a radial length of between approximately 150 and 300 mm, or approximately 6 to 12 inches. Radius 24 acts to encourage deflection of an impacting vehicle back into the roadway. Importantly, radius 24 prevents a spearing impact of a sharp edge into an engaging vehicle. In the embodiment illustrated, there is a radius 24 at the intersection of field side 22 and access end 16 of terminal block 10. In this configuration, terminal block 10 is reversible with regard to radius 24 and in relationship to the roadway.

Figure 7:
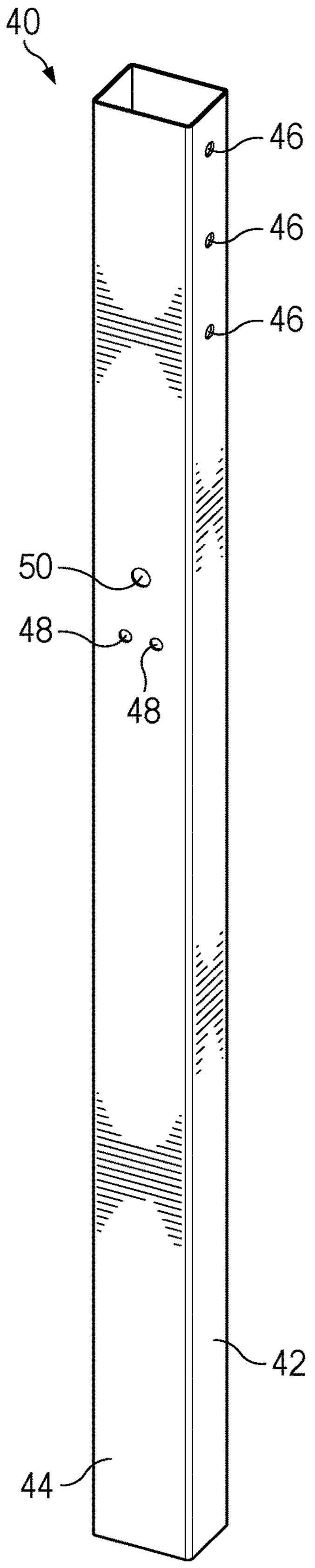
FIG. 7 is a perspective view of a foundation post component of the pedestrian access terminal illustrated in FIG. 1.

FIG. 7 is a perspective view of foundation post 40 of the embodiment of pedestrian access terminal 1 illustrated in FIG. 1. As seen in FIG. 7, foundation post 40 is a hollow rectangular tubular. Foundation post 40 has a first pair of opposing sides 42, one of which being a traffic side, in that it faces the roadway when installed into the soil. Foundation post 40 has a second pair of opposing sides 44, one of which being an access side, in that it faces the opening between terminal blocks 10 through which pedestrians may pass.

Block fastener ports 46 extend through the first pair of opposing sides of foundation post 40. As best seen in FIG. 2, portal fasteners 36 pass through portal orifices 32 and into portal 26 to connect transition 100, terminal block 10, and foundation post 40.

A tensioning portal 50 extends through the second pair of opposing sides of each foundation post. Tensioning portal 50 receives a wire rope 84 portion of tensioning member 80 extending through tensioning portal 50 of each foundation post 40. As may best be seen in FIG. 10, a swage button 82 is located on the end of each wire rope 84.

Figures 10, 11, 12:
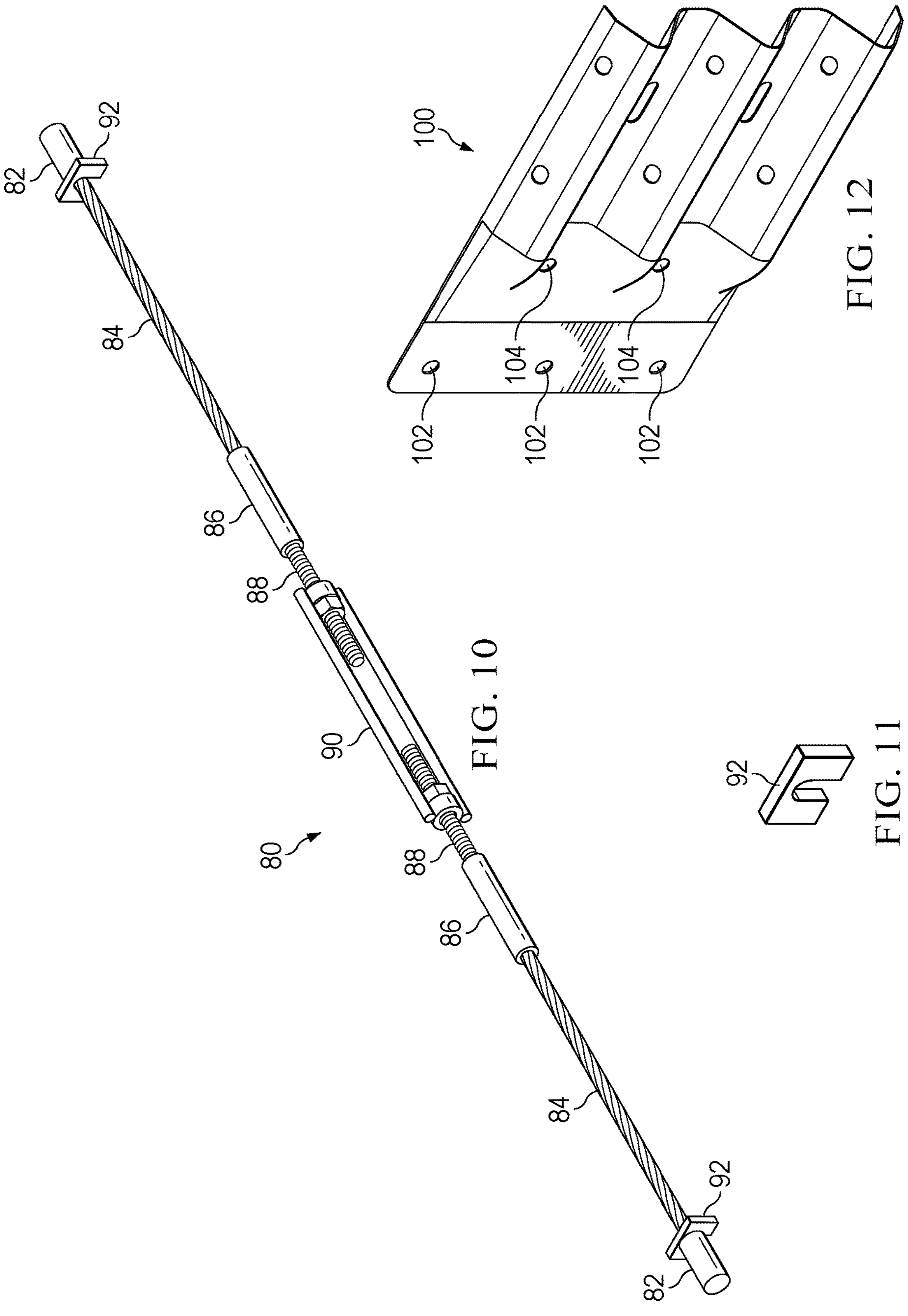
FIG. 10 is a perspective view of a subsurface tensioning member of the pedestrian access terminal illustrated in FIG. 1.
FIG. 11 is a perspective view of a plate washer component of the pedestrian access terminal illustrated in FIG. 1.
FIG. 12 is a perspective view of a traffic barrier end connector that is connectable to the pedestrian access terminal illustrated in FIG. 1.
Figure 18:
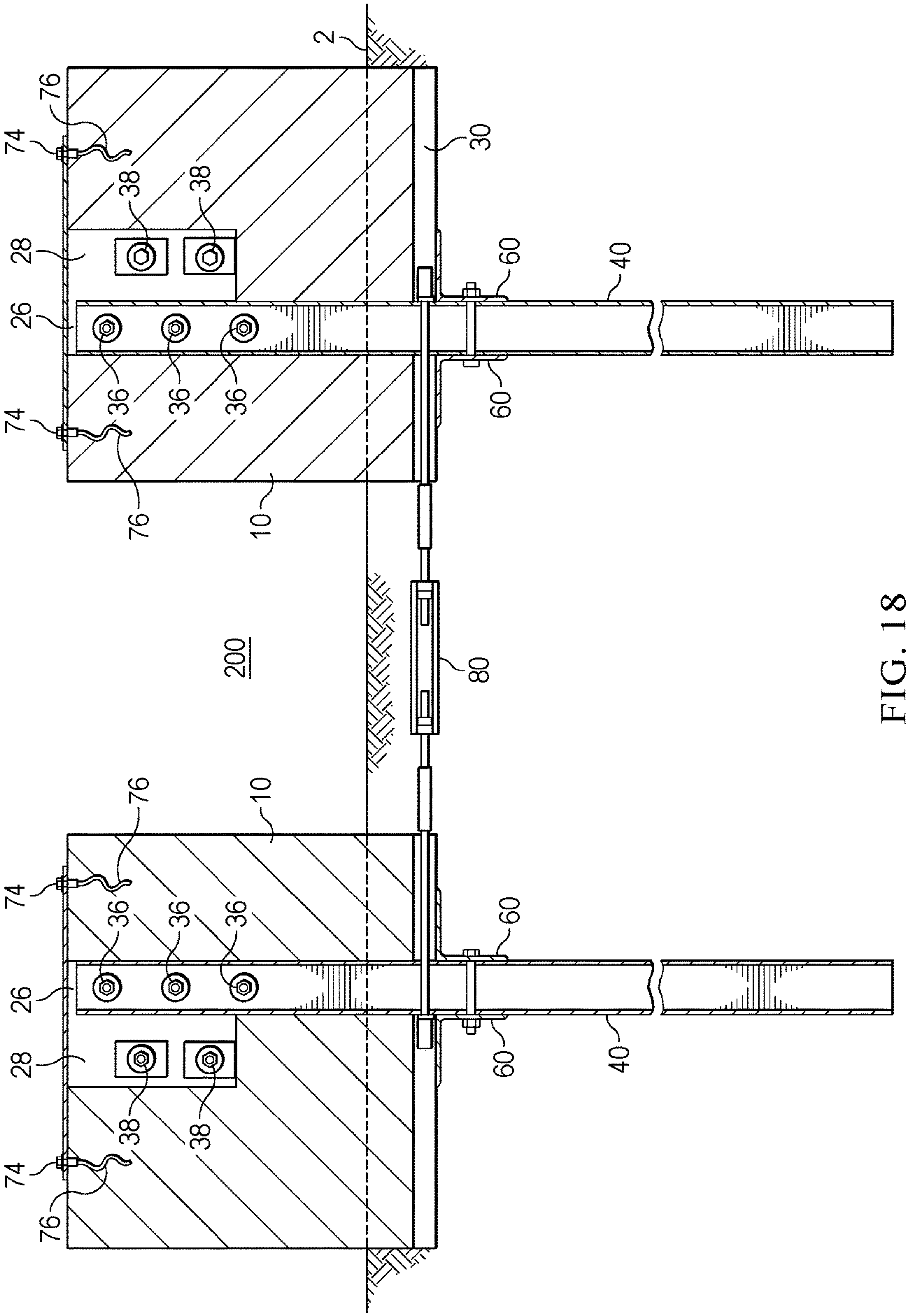
FIG. 18 is a side sectional view of the embodiment of the pedestrian access terminal illustrated in FIG. 1.

As may be best seen in FIGS. 10 and 18, a plate washer 92 anchors swage button 82 at each end of tensioning member 80 against foundation post 40 to allow tensioning member 80 to be tensioned as between foundation posts 40.

Referring back to FIG. 7, plate fastener ports 48 extend through the second pair of opposing sides 44 of foundation post 40, beneath, and proximate to tensioning portal 50. As can be seen in FIG. 2, soil plates 60 are attached to foundation post 40 by plate fasteners 68 passing through plate fastener ports 48. Foundation posts 40 may be about 10 feet long. Foundation posts 40 embedded at least 7 feet below the surface will achieve the performance characteristics detailed herein.

Figure 8:
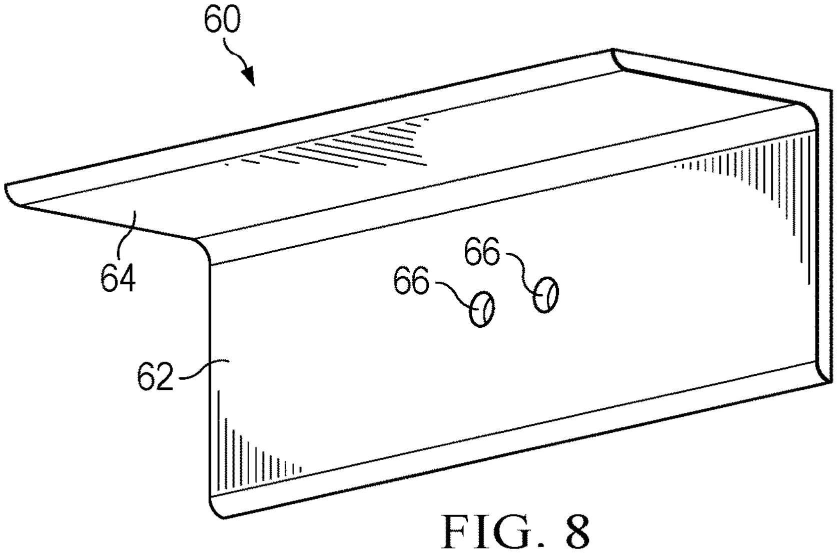
FIG. 8 is a perspective view of a soil plate component of the pedestrian access terminal illustrated in FIG. 1.

FIG. 8 is a perspective view of soil plate 60 of the embodiment of pedestrian access terminal 1 illustrated in FIG. 1. As seen in FIG. 8, soil plate 60 has a post side 62 and a block side 64. Fastener ports 66 are located on post side 62. Post side 62 of soil plate 60 is positioned against foundation post 40 such that fastener ports 66 align with plate fastener ports 48 of foundation post 40. In this position of the embodiment illustrated, block fastener ports 46 will simultaneously align with portal orifices 32 of terminal block 10, and tensioning portal 50 will be positioned in a relief 30 at terminal bottom 14. The simultaneous alignment provides the connectivity illustrated in FIG. 18.

Plate fasteners 68 are positioned through plate fastener ports 48 and fastener ports 66 to secure soil plate 60 to foundation post 40. Block side 64 of soil plate 60 facilitates the advantageous three-way alignment of this embodiment by abutment with terminal bottom 14 of terminal block 10. In this manner, assembly of pedestrian access terminal 1 is much expedited.

Figure 9:
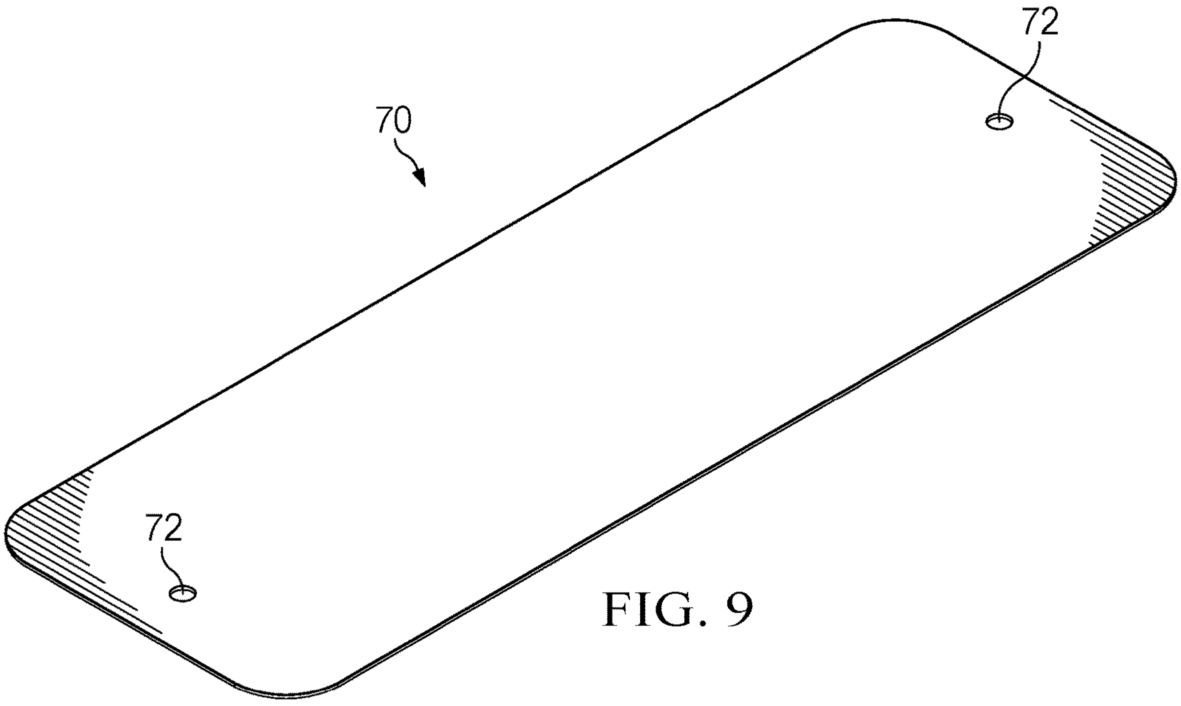
FIG. 9 is a perspective view of a cover plate component of the pedestrian access terminal illustrated in FIG. 1.

FIG. 9 is a perspective view of cover plate 70 of the embodiment pedestrian access terminal 1 illustrated in FIG. 1. Cover plate 70 has a pair of cover ports 72. Cover plate 70 is sufficiently large to cover portal 26 and chamber 28 as they intersect terminal top 12 as seen in FIG. 5. Cover fasteners 74 are connectable to lifting anchors 76 to secure cover plate 70 to terminal block 10. Cover plate 70 provides an aesthetic improvement to pedestrian access terminal 1 and prevents pedestrians from dropping trash, phones, babies, or other objects into portal 26 and chamber 28. Cover plate 70 may be embossed with a city logo or other imagery to further advantage the aesthetic value of pedestrian access terminal 1.

FIG. 10 is a perspective view of tensioning member 80 of the embodiment pedestrian access terminal 1 illustrated in FIG. 1. As seen in this view, tensioning member 80 is comprised of swage button 82 that is swaged onto a length of wire rope 84 at each end of tensioning member 80. Each section of wire rope 84 is connected to a threaded bar 88 by a connector 86. Threaded bars 88 are threadably connected to a turnbuckle 90.

FIG. 11 is a perspective view of plate washer 92 of the embodiment pedestrian access terminal 1 illustrated in FIG. 1. As previously described, and as best seen in FIGS. 10 and 18, plate washer 92 anchors swage button 82 at each end of tensioning member 80 against foundation post 40 to allow tensioning member 80 to be tensioned as between foundation posts 40.

Pre-tensioning of opposing terminal blocks 10 to each other provides a greatly enhanced resistance to displacement of either terminal block 10 by a vehicle leaving the roadway. The flexibility of the disclosed tensioning member 80, which is provided by wire rope sections 84, provides enhanced assembly of pedestrian access terminal 1. The minimal size of tensioning member 80 further provides for rapid and cost-effective subterranean location of tensioning member 80.

FIG. 12 is a perspective view of transition 100 for connection of pedestrian access terminal 1 to guardrail 106 as seen in FIG. 1. In the embodiment illustrated, transition 100 has a plurality of primary portals 102. Transition 100 may have a plurality of secondary portals 104. The transition 100 illustrated is commonly known in the road safety industry as a thrie-beam terminal connector. As illustrated in FIG. 2, portal fasteners 36 secure transition 100 to terminal block 10 through primary portals 102. Chamber fasteners 38 further secure transition 100 to terminal block 10 through secondary portals 104.

Figure 14:
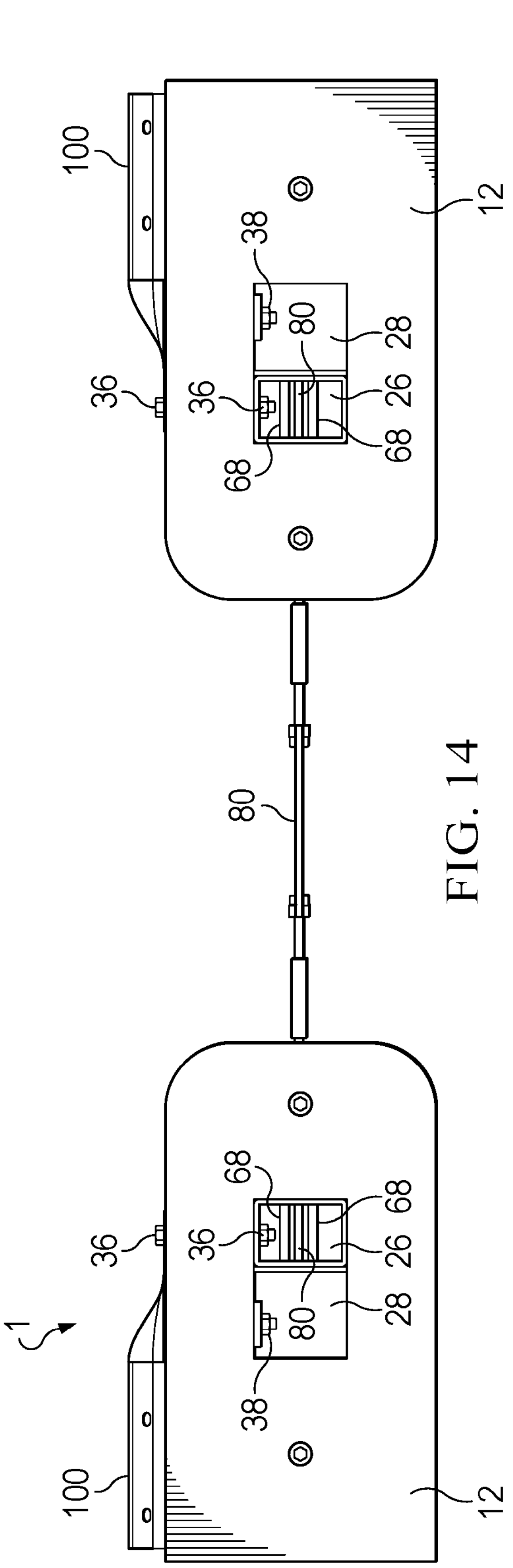
FIG. 14 is a top view of the embodiment of the pedestrian access terminal illustrated in FIG. 1, with the cover plate removed.

FIG. 13 is a top view of the embodiment of pedestrian access terminal 1 illustrated in FIG. 1. FIG. 14 is a top view of the same embodiment, illustrated with cover plate 70 removed for visibility. As seen in FIG. 14, portal fasteners 36 are connectable using tools on traffic side 20 of terminal block 10 and within portal 26 of terminal block 10. Similarly, chamber fasteners 38 are connectable using tools on traffic side 20 of terminal block 10 and within chamber 28 of terminal block 10.

With terminal block 10 aligned with foundation post 40, connection of transition 100 to terminal block 10 is easily facilitated. By replacing cover plate 70 over portal 26 and chamber 28, access to fasteners 36 and 38 is not possible and pedestrian access terminal 1 becomes tamper resistant. Having chamber 28 terminate interior to terminal block 10 provides the advantage of preventing loss of fasteners and tools through the interior of terminal block 10 during assembly.

FIG. 15 is a top view of the embodiment of pedestrian access terminal 1 illustrated in FIG. 1, illustrating various passages internal to terminal block 10. In the embodiment illustrated, tensioning member 80 is shown within relief 30 and terminating beneath chamber 28. Portal orifices 32 and chamber orifices 34 are shown traversing from the traffic side 20 of terminal block 10 to the field side 22 of terminal block 10.

Figure 16:
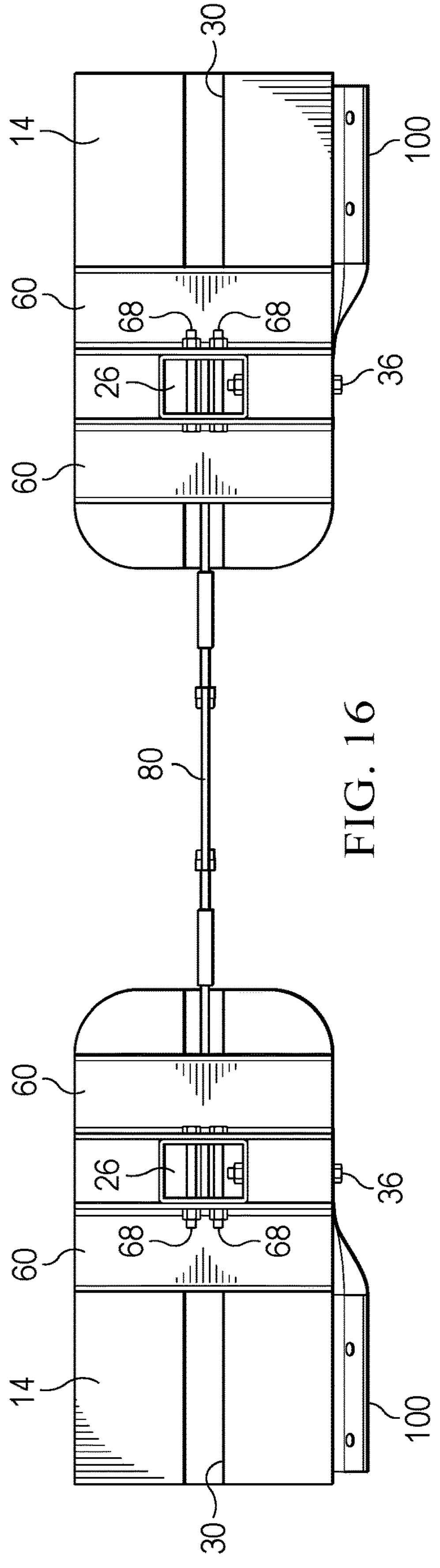
FIG. 16 is a bottom view of the embodiment of the pedestrian access terminal illustrated in FIG. 1.

FIG. 16 is a bottom view of the embodiment of pedestrian access terminal 1 illustrated in FIG. 1. As seen in FIG. 16, relief 30 extends the full length of terminal block 10. Thus, as illustrated in FIGS. 15 and 16, terminal block 10 is reversible and can be used on either side of the pedestrian access passageway between terminal blocks 10.

FIG. 17 is a side view of the embodiment of pedestrian access terminal 1 illustrated in FIG. 1. FIG. 18 is a side sectional view of the same embodiment. As best seen in FIG. 18, tensioning member 80 is located in relief 30 of terminal block 10. Chamber fasteners 38 are accessible through chamber 28. Portal fasteners 36 are accessible through portal 26.

Terminal blocks 10 rest on soil plates 60 attached to foundation posts 40. Force applied in a collision to one end of tensioning member 80 would normally apply a bending moment on the opposing foundation post 40. In the configuration as designed and disclosed, foundation post 40 is fortified against bending by engagement within terminal block 10 above tensioning member 80, and by engagement with soil plate 60 below tensioning member 80.

Figure 19:
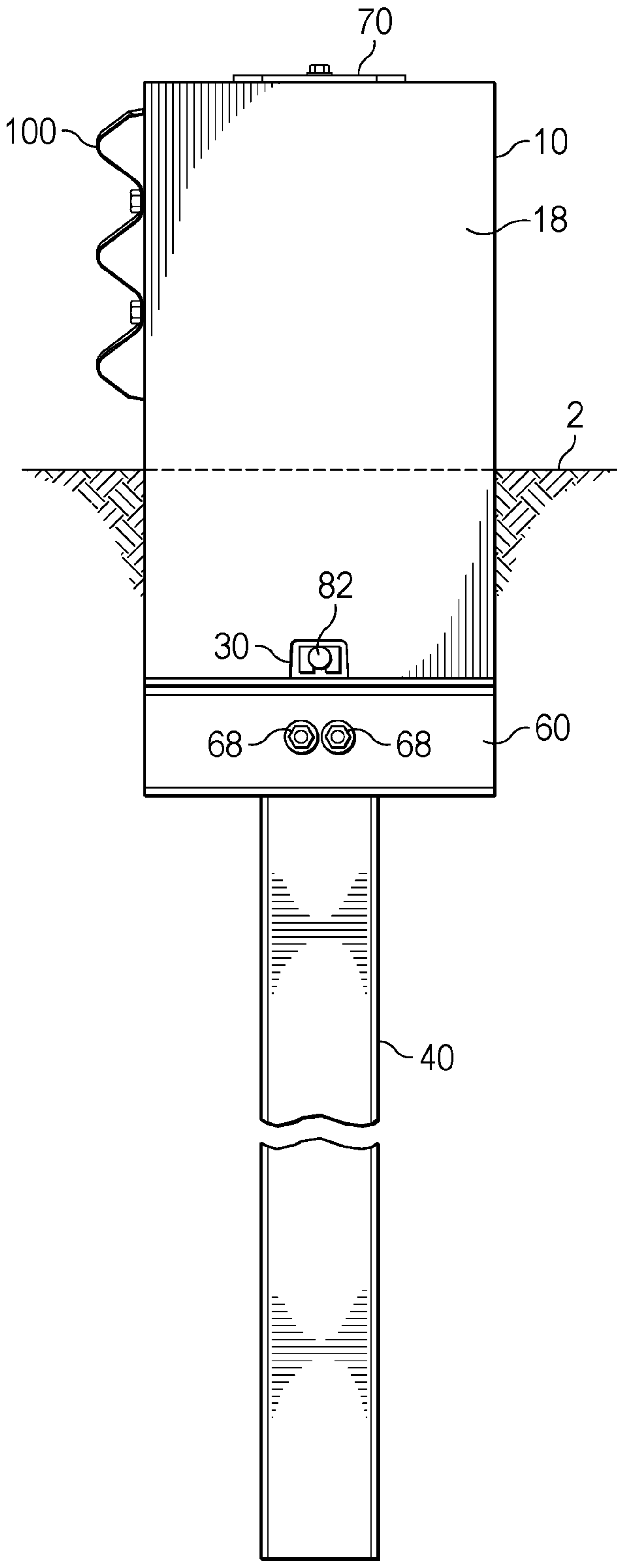
FIG. 19 is an end view of the embodiment of the pedestrian access terminal illustrated in FIG. 1.

FIG. 19 is an end view of the embodiment of pedestrian access terminal 1 illustrated in FIG. 1, illustrating no-access end 18 of terminal block 10. As previously described, terminal block 10 is preferably set below surface 2. In one embodiment, terminal block 10 is set partially subsurface by an amount of between 4 and 12 inches. In the embodiment shown, terminal block 10 is set 8 inches below surface 2. Soil plate 60 is fully below surface 2. Soil plate 60 is particularly oriented perpendicular to the direction of traffic (parallel to no-access end 18 of terminal block 10) to resist lateral displacement of pedestrian access terminal 1 on impact with terminal block 10 by soil plate 60 engagement with the soil. The large cross-sectional area of soil plate 60 optimizes resistance to displacement.

Figure 20:
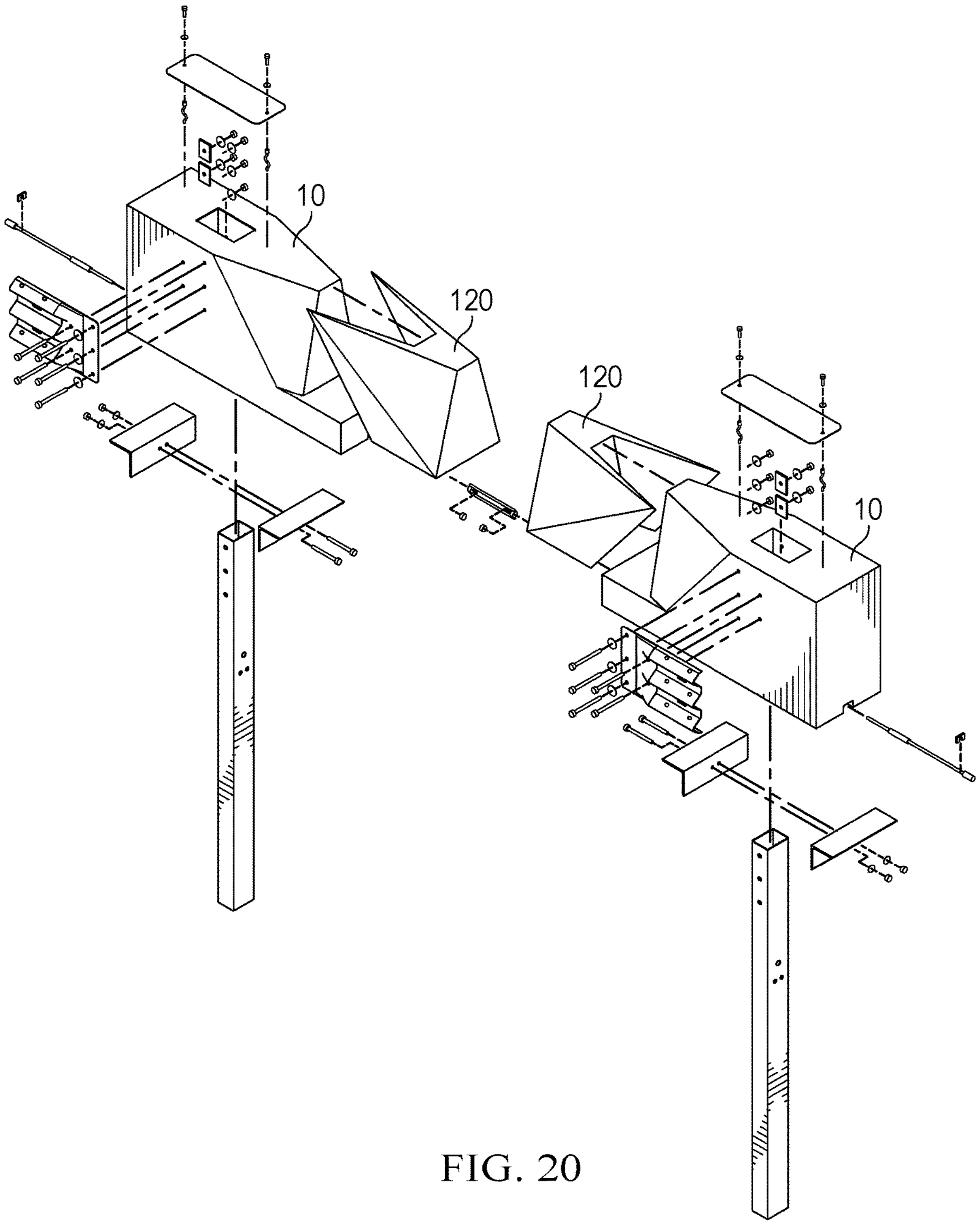
FIG. 20 is an exploded perspective view of an alternative embodiment in which an energy absorbing endcap is mounted on the terminal block.

FIG. 20 is an exploded perspective view of an alternative embodiment in which an energy absorbing endcap 120 is mounted on the precast concrete terminal block 10. Endcap 120 is intended to be sacrificial and replaceable. Endcap 120 may be a compressible structure such as a honeycomb structure. Endcap 120 may be made of a compressible material such as a synthetic rubber, plastic, or other material with similar properties. Endcap 120 may alternatively comprise a shell filled with a compressible material.

The addition of energy absorbing endcap 120 is intended to work in conjunction with the crushing of the front of the passenger vehicle during impact at a velocity in excess of the IIHS requirement of 64.5 km/h [40 mph] to achieve a successful test under MASH TL-2 (passenger vehicles including 5,000 pound quad-cab pickup truck and 2,425 pound small car impacting the terminal block at 70 km/h [43.4 mph] at 25 degrees).

As used herein, the term "substantially" is intended for construction as meaning "more so than not."

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A pedestrian access terminal, comprising:
- a right side and a left side terminal block, each terminal block comprising:
  - a top and an opposite bottom, the bottom positioned beneath a surface of a road;
  - an access end, and an opposite non-access end; and,
  - a traffic side and an opposite field side;
- a portal extending from the top to the bottom;
- portal orifices extending through the traffic side to intersect the portal;
- a pair of foundation posts extending below the surface and extending above the surface and into the portal of each terminal block;
- portal fasteners located in the portal orifices of the traffic side and connecting each foundation post to each terminal block; and,
- a tensioning member extending between the foundation posts, beneath the terminal blocks.

2. The pedestrian access terminal of claim 1, further comprising:
- the terminal blocks having a mass of between 3,000 and 3,500 lbs.; and,
- the terminal blocks being located a distance of between 3.3 and 4.9 feet (1.0 and 1.5 meters) apart.

3. The pedestrian access terminal of claim 1, further comprising:
- the terminal blocks having a radius of at least 0.5 feet (or 150 mm) at the intersection of the traffic side and the access end.

4. The pedestrian access terminal of claim 1, further comprising:
- the bottom of the terminal blocks being set between 4 and 12 inches below the surface.

5. The pedestrian access terminal of claim 1, further comprising:
- the foundation posts being embedded at least 7 feet below the surface.

6. The pedestrian access terminal of claim 1, further comprising:
- a chamber extending through the top of the terminal block adjacent to the portal;
- the chamber terminating internal to the terminal block;
- chamber orifices extending from the traffic side and the field side to the chamber; and,
- chamber fasteners located in the chamber orifices connect a traffic barrier to the terminal block.

7. The pedestrian access terminal of claim 1, further comprising:
- the tensioning member further comprising:
  - a centralized turnbuckle;
  - a threaded bar extending from each end of the turnbuckle;
  - a connector at the end of each threaded bar;
  - a wire rope extending from each connector;
  - a swage button on the opposite end of each wire rope portion; and,
  - a plate washer locking the swage button of each end of the tensioning member against the foundation post.

8. The pedestrian access terminal of claim 1, further comprising:
- a relief on the bottom of the terminal block;
- the relief intersecting the portal opening at the bottom of the terminal block; and,
- the tensioning member located in the relief of the terminal block and being anchored against the foundation post.

9. The pedestrian access terminal of claim 1, further comprising:
- a pair of lifting anchors located at the top of each terminal block;
- a cover plate sufficiently large to cover the portal and the chamber on the top of the terminal block;
- a pair of cover ports on the cover plate; and,
- cover fasteners located in the cover plate and connected to the lifting anchors to secure the cover plate to the top of the terminal block.

10. The pedestrian access terminal of claim 1, further comprising:
- an energy absorbing endcap attached to the access end of the terminal block.

11. The foundation post of claim 1, further comprising:
- a hollow rectangular tubular;
- a first pair of opposing sides, one of which being a traffic side;
- a second pair of opposing sides, one of which being an access side;
- block fastener ports extending through the first pair of opposing sides; and,
- the portal fasteners passing through the portal orifices and into the portal to connect a traffic barrier and foundation post to the terminal block.

12. The pedestrian access terminal of claim 11, further comprising:

a tensioning portal extending through the second pair of opposing sides of each foundation post;

a wire rope portion of the tensioning member extending through the tensioning portal of each foundation post;

a swage button on the end of each wire rope portion; and, a plate washer anchoring the swage button at each end of the tensioning member against the foundation post to allow the tensioning member to be tensioned as between the foundation posts.

13. The pedestrian access terminal of claim 11, further comprising:

plate fastener ports extending through the second pair of opposing sides of the foundation post, beneath the tensioning portal;

a soil plate having fastener ports in alignment with the plate fastener ports; and, soil plate fasteners located through the fastener ports of the soil plate and the plate fastener ports of the foundation post to secure the soil plate to the foundation post.

14. A pedestrian access terminal, comprising:

a right side and a left side terminal block, each terminal block comprising:

a top and an opposite bottom, the bottom positioned beneath a surface of a road;

an access end, and an opposite non-access end; and, a traffic side and an opposite field side;

a portal extending from the top to the bottom;

portal orifices extending through the traffic side to intersect the portal;

a pair of foundation posts positioned below the surface and extending above the surface and into the portal of each terminal block;

portal fasteners located in the portal orifices of the traffic side and connecting each foundation post to each terminal block; and, an angled soil plate attached to each foundation post, beneath the terminal block.

15. The pedestrian access terminal of claim 14, further comprising:

the terminal blocks having a mass of between 3,000 and 3,500 lbs.; and, the terminal blocks being located between 3.3 and 4.9 feet (1.0 and 1.5 meters) apart.

16. The pedestrian access terminal of claim 14, further comprising:

the terminal blocks having a radius of at least 0.5 feet (or 150 mm) at the intersection of the traffic side and the access end.

17. The pedestrian access terminal of claim 14, further comprising:

the bottom of the terminal blocks being set between 4 and 12 inches below the surface.

18. The pedestrian access terminal of claim 14, further comprising:

the foundation posts being embedded at least 7 feet below the surface.

19. The pedestrian access terminal of claim 14, further comprising:

a chamber extending through the top of the terminal block adjacent to the portal;

the chamber terminating internal to the terminal block;

chamber orifices extending from the traffic side and the field side to the chamber; and, chamber fasteners located in the chamber orifices connect a traffic barrier to the terminal block.

20. The pedestrian access terminal of claim 14, further comprising:

a pair of lifting anchors located at the top of each terminal block;

a cover plate sufficiently large to cover the portal and the chamber on the top of the terminal block;

a pair of cover ports on the cover plate; and, cover fasteners located in the cover plate and connected to the lifting anchors to secure the cover plate to the top of the terminal block.

21. The pedestrian access terminal of claim 14, further comprising:

an energy absorbing endcap attached to the access end of the terminal block.

22. The foundation post of claim 14, further comprising:

a hollow rectangular tubular;

a first pair of opposing sides, one of which being a traffic side;

a second pair of opposing sides, one of which being an access side; and, the portal fasteners passing through the portal orifices and into the portal to connect a traffic barrier and foundation post to the terminal block.

23. The pedestrian access terminal of claim 14, further comprising:

plate fastener ports extending through the second pair of opposing sides of the foundation post;

a soil plate having fastener ports in alignment with the plate fastener ports; and, soil plate fasteners located through the soil plate fastener ports and the foundation post plate fastener ports to secure the soil plate to the foundation post beneath the terminal block.

24. The pedestrian access terminal of claim 22, further comprising:

a tensioning portal extending through the second pair of opposing sides of each foundation post; and, a tensioning member extending through the tensioning portals of the foundation posts, beneath the terminal blocks.

25. The pedestrian access terminal of claim 24, further comprising:

a relief on the bottom of the terminal block;

the relief intersecting the portal opening at the bottom of the terminal block;

the tensioning member located in the relief of the terminal block and being anchored against the foundation post.

26. The pedestrian access terminal of claim 24, further comprising:

the tensioning member further comprising:

a centralized turnbuckle;

a threaded bar extending from each end of the turnbuckle;

a connector at the end of each threaded bar, a wire rope extending from each connector, a swage button on the opposite end of each wire rope portion; and, a plate washer locking the swage button of each end of the tensioning member against the foundation post.

* * * * *